United States Patent
Poddar et al.

(10) Patent No.: US 8,532,100 B2
(45) Date of Patent: Sep. 10, 2013

(54) SYSTEM AND METHOD FOR DATA EXCHANGE IN A HETEROGENEOUS MULTIPROCESSOR SYSTEM

(75) Inventors: Sanjoy K. Poddar, Cupertino, CA (US); Tapabrata Biswas, Santa Clara, CA (US); David A. Pearson, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 389 days.

(21) Appl. No.: 12/907,910

(22) Filed: Oct. 19, 2010

(65) Prior Publication Data

US 2012/0093155 A1    Apr. 19, 2012

(51) Int. Cl.
*H04L 12/56* (2006.01)
*H04J 1/16* (2006.01)

(52) U.S. Cl.
USPC ........... 370/389; 370/252; 370/486; 370/503; 370/535

(58) Field of Classification Search
USPC .......................... 370/252, 389, 503, 486, 535
See application file for complete search history.

(56) References Cited

U.S. PATENT DOCUMENTS

| | | |
|---|---|---|
| 4,650,939 A | 3/1987 | Boerger et al. |
| 4,734,764 A | 3/1988 | Pocock et al. |
| 4,882,747 A | 11/1989 | Williams |
| 5,175,824 A | 12/1992 | Soderbery et al. |
| 5,201,038 A | 4/1993 | Fielder |
| 5,440,563 A | 8/1995 | Isidoro et al. |
| 5,473,367 A | 12/1995 | Bales et al. |
| 5,483,588 A | 1/1996 | Eaton et al. |
| 5,495,522 A | 2/1996 | Allen et al. |
| 5,600,646 A | 2/1997 | Polomski |
| 5,640,195 A | 6/1997 | Chida |
| 5,771,273 A | 6/1998 | McAllister et al. |
| 5,821,985 A | 10/1998 | Iizawa |
| 5,841,763 A | 11/1998 | Leondires et al. |
| 5,850,266 A | 12/1998 | Gimby |

(Continued)

FOREIGN PATENT DOCUMENTS

| | | |
|---|---|---|
| EP | 2045983 | 4/2009 |
| GB | 2397964 | 8/2004 |

(Continued)

OTHER PUBLICATIONS

U.S. Appl. No. 12/689,328, filed Jan. 19, 2010, entitled "Transporting Real Time Video Frames Over an Ethernet Network," Inventors: Tapabrata Biswas et al.

(Continued)

*Primary Examiner* — John Pezzlo
(74) *Attorney, Agent, or Firm* — Patent Capital Group

(57) ABSTRACT

A method is provided in one example embodiment and includes generating a request for header data, the request is sent to a first processor. The method also includes receiving a response from the first processor that is indicative of video data for a virtual frame to be communicated. A multiplex table is generated based on the response. The method also includes evaluating a multiplex entry in the multiplex table for synchronization with a line number, and requesting the first processor to send at least a portion of the virtual frame after the synchronization. The method further includes communicating a packet, which includes a payload associated with the virtual frame and a packet header that includes multiplex data associated with the multiplex entry.

20 Claims, 7 Drawing Sheets

(56) References Cited

U.S. PATENT DOCUMENTS

| | | |
|---|---|---|
| 5,867,653 A | 2/1999 | Aras et al. |
| 5,872,922 A | 2/1999 | Hogan et al. |
| 5,929,898 A | 7/1999 | Tanoi |
| 5,982,459 A | 11/1999 | Fandrianto et al. |
| 5,999,981 A | 12/1999 | Willenz et al. |
| 6,025,870 A | 2/2000 | Hardy |
| 6,128,649 A | 10/2000 | Smith et al. |
| 6,215,515 B1 | 4/2001 | Voois et al. |
| 6,366,771 B1 | 4/2002 | Angle et al. |
| 6,370,113 B1 | 4/2002 | Paradiso et al. |
| 6,442,758 B1 | 8/2002 | Jang et al. |
| 6,445,472 B1 | 9/2002 | Kim et al. |
| 6,493,872 B1 | 12/2002 | Rangan et al. |
| 6,496,216 B2 | 12/2002 | Feder et al. |
| 6,526,557 B1 | 2/2003 | Young et al. |
| 6,574,469 B1 | 6/2003 | Xiang et al. |
| 6,577,712 B2 | 6/2003 | Larsson et al. |
| 6,584,076 B1 | 6/2003 | Aravamudan et al. |
| 6,584,077 B1 | 6/2003 | Polomski |
| 6,590,604 B1 | 7/2003 | Tucker et al. |
| 6,614,465 B2 | 9/2003 | Alexander et al. |
| 6,614,845 B1 | 9/2003 | Azadegan |
| 6,633,324 B2 | 10/2003 | Stephens, Jr. |
| 6,697,476 B1 | 2/2004 | O'Malley et al. |
| 6,750,896 B2 | 6/2004 | McClure |
| 6,757,005 B1 | 6/2004 | Elbaz et al. |
| 6,760,749 B1 | 7/2004 | Dunlap et al. |
| 6,760,776 B1 | 7/2004 | Gallo et al. |
| 6,771,779 B1 | 8/2004 | Eriksson et al. |
| 6,810,035 B1 | 10/2004 | Knuutila et al. |
| 6,883,084 B1 | 4/2005 | Donohoe |
| 6,963,353 B1 | 11/2005 | Firestone |
| 6,989,856 B2 | 1/2006 | Firestone et al. |
| 7,075,557 B2 | 7/2006 | Ludtke et al. |
| 7,113,200 B2 | 9/2006 | Eshkoli |
| 7,136,475 B1 | 11/2006 | Rogers et al. |
| 7,139,015 B2 | 11/2006 | Eshkoli et al. |
| 7,152,151 B2 | 12/2006 | Smith |
| 7,366,780 B2 | 4/2008 | Keller et al. |
| 7,536,705 B1 | 5/2009 | Boucher et al. |
| 7,889,226 B2 | 2/2011 | Evans |
| 8,085,855 B2 | 12/2011 | Bennett |
| 8,274,905 B2 * | 9/2012 | Edwards et al. ............... 370/252 |
| 2002/0044201 A1 | 4/2002 | Alexander et al. |
| 2002/0064149 A1 | 5/2002 | Elliott et al. |
| 2003/0023459 A1 | 1/2003 | Shipon |
| 2004/0012600 A1 | 1/2004 | Deering |
| 2004/0015633 A1 | 1/2004 | Smith |
| 2004/0207724 A1 | 10/2004 | Crouch et al. |
| 2005/0044503 A1 | 2/2005 | Richardson et al. |
| 2005/0062497 A1 | 3/2005 | Pellizzer et al. |
| 2005/0108328 A1 | 5/2005 | Berkeland et al. |
| 2005/0166040 A1 * | 7/2005 | Walmsley ..................... 713/150 |
| 2005/0248652 A1 | 11/2005 | Firestone et al. |
| 2006/0026002 A1 | 2/2006 | Potekhin et al. |
| 2006/0077252 A1 | 4/2006 | Bain et al. |
| 2006/0080420 A1 | 4/2006 | Backman et al. |
| 2006/0164507 A1 | 7/2006 | Eshkoli et al. |
| 2006/0164508 A1 | 7/2006 | Eshkoli et al. |
| 2006/0237835 A1 | 10/2006 | Fujita et al. |
| 2006/0245379 A1 | 11/2006 | Abuan et al. |
| 2008/0123967 A1 | 5/2008 | Berini et al. |
| 2008/0158338 A1 | 7/2008 | Evans et al. |
| 2008/0192818 A1 | 8/2008 | DiPietro et al. |
| 2008/0244676 A1 | 10/2008 | DaCosta |
| 2008/0285643 A1 | 11/2008 | Diab |
| 2009/0213126 A1 | 8/2009 | Evans |
| 2010/0229210 A1 | 9/2010 | Sharp et al. |
| 2010/0253840 A1 | 10/2010 | Nave |
| 2011/0002376 A1 | 1/2011 | Ahmed et al. |
| 2012/0038901 A1 | 2/2012 | McKaughan et al. |

FOREIGN PATENT DOCUMENTS

| | | |
|---|---|---|
| WO | WO93/14459 | 7/1993 |
| WO | WO96/08911 | 3/1996 |
| WO | WO96/23388 | 8/1996 |
| WO | WO03/063484 | 7/2003 |
| WO | WO2005/112424 | 11/2005 |

OTHER PUBLICATIONS

USPTO Aug. 29, 2011 Non-Final Office Action from U.S. Appl. No. 12/463,031.

USPTO Nov. 29, 2011 Response to Aug. 29, 2011 Non-Final Office Action from U.S. Appl. No. 12/463,031.

USPTO Jan. 12, 2012 Notice of Allowance from U.S. Appl. No. 12/463,031.

USPTO May 17, 2012 Non-Final Office Action from U.S. Appl. No. 12/689,328.

USPTO Aug. 17, 2012 Response to May 17, 2012 Non-Final Office Action from U.S. Appl. No. 12/689,328.

USPTO Sep. 19, 2012 Notice of Allowance from U.S. Appl. No. 12/689,328.

Holfelder, W. "Interactive Remote Recording and Play-back of Multicast Videoconferences," Computer Communications 21(15): 1285-1294. (Oct. 1998). Abstract Only.

International Telecommunication Union. "H.323 Annex M3: Tunnelling of DSSI Through H.323," (Jul. 2001). 10 pages.

International Telecommunication Union. "H.323 Annex Q: Far-end Camera Control and H,281/H.224," (Jul. 2001). 9 pages.

International Telecommunication Union. "H.323: Packet-based Multimedia Communications Systems," (Feb. 1998). 127 pages.

Lukacs, M.E., et al. "The Personal Presence System Hardware Architecture," ACM Multimedia '94 Proceedings, San Francisco, CA, Oct. 15-20, 1994, pp. 69-76. Abstract Only.

Parnes, P. et al. "mTunnel: A Multicast Tunneling System With a User Based Quality-of-Service Model," Interactive Distributed Multimedia Systems and Telecommunication Services, (Jun. 1997). 10 pages.

\* cited by examiner

| 63 | 47 | 31 | 15 |
|---|---|---|---|
| NUMBER OF SUB-FRAME | ETHERNET DA[47:32] | ETHERNET DA[31:16] | ETHERNET DA[15:0] |
| ETHERNET SA[47:32] | ETHERNET SA[31:16] | ETHERNET SA[15:0] | 0x8100 |
| VLAN TAG | ETHER TYPE | STREAM IDENTIFICATION | FRAME NUMBER |
| START SCAN LINE | END SCAN LINE | LENGTH[31:16] | LENGTH[15:0] |
| RESERVED | ETHERNET DA[47:32] | ETHERNET DA[31:16] | ETHERNET DA[15:0] |
| ETHERNET SA[47:32] | ETHERNET SA[31:16] | ETHERNET SA[15:0] | 0x8100 |
| VLAN TAG | ETHER TYPE | STREAM IDENTIFICATION | FRAME NUMBER |
| START SCAN LINE | END SCAN LINE | LENGTH[31:16] | LENGTH[15:0] |
| RESERVED | ... | ... | ... |

FIG. 4

SYSTEM AND METHOD FOR DATA EXCHANGE IN A HETEROGENEOUS MULTIPROCESSOR SYSTEM

TECHNICAL FIELD

This disclosure relates in general to the field of communications, and more particularly, to exchanging data in a heterogeneous multiprocessor system.

BACKGROUND

Video processing may include operations such as encoding, transcoding, etc. that can leverage different types of processors to support real-time applications. These applications can include high definition (HD) protocols such as HD broadcast, HD multi-node video conferencing, multi-format video transcoding, etc. Unfortunately, multiprocessor systems commonly provision diverse processor, which are manufactured by different vendors. For example, Digital Signal Processors (DSPs), graphics processors, and multi-core processors may not share a common high-speed interface, which is usually employed to share the enormous volume of real-time data. Moreover, these processors do not share a common protocol for synchronization purposes. Accordingly, the ability to provide a scalable system with clusters of processors that can accommodate different applications in a network environment presents a significant challenge to component manufacturers, network operators, and service providers alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 4 is a simplified diagram illustrating an example embodiment of a header format that may be used in the data processing system;

DETAILED DESCRIPTION OF EXAMPLE EMBODIMENTS

Overview

A method is provided in one example embodiment and includes generating a request for header data, the request can be sent to a first processor. The method also includes receiving a response from the first processor that is indicative of video data for a virtual frame to be communicated. A multiplex table is generated based on the response. The method also includes evaluating a multiplex entry in the multiplex table for synchronization with a line number, and requesting the first processor to send at least a portion of the virtual frame after the synchronization. The method further includes communicating a packet, which includes a payload associated with the virtual frame and a packet header that includes multiplex data associated with the multiplex entry.

In more specific embodiments, the method can include receiving the packet through a switch fabric; extracting scan line data from the packet; assembling the scan line data into an additional frame; and sending the additional frame to a second processor. A buffer level can be evaluated in order to determine whether to send an additional request to the first processor in order to communicate remaining portions of the virtual frame. Information within the packet header can be evaluated for positioning into a de-multiplex table, and the video content that is received is positioned in a line buffer.

In yet other implementations, at least a portion of the virtual frame is forwarded to a second processor for additional processing. Each processing task performed by the first and second processors is completed during a video frame rate set by a global clock coupled to the first processor and the second processor. The packet can be a layer 2 (L2) packet that includes a destination address, the packet being communicated to a switch fabric of a network element. The packet header can include any number of fields, such as: a field indicative of a number of sub-frames associated with scan line data; a source address field; a virtual local area network (VLAN) tag field; a stream identification field; a frame number field; and a length field.

Example Embodiments

Figure 1:
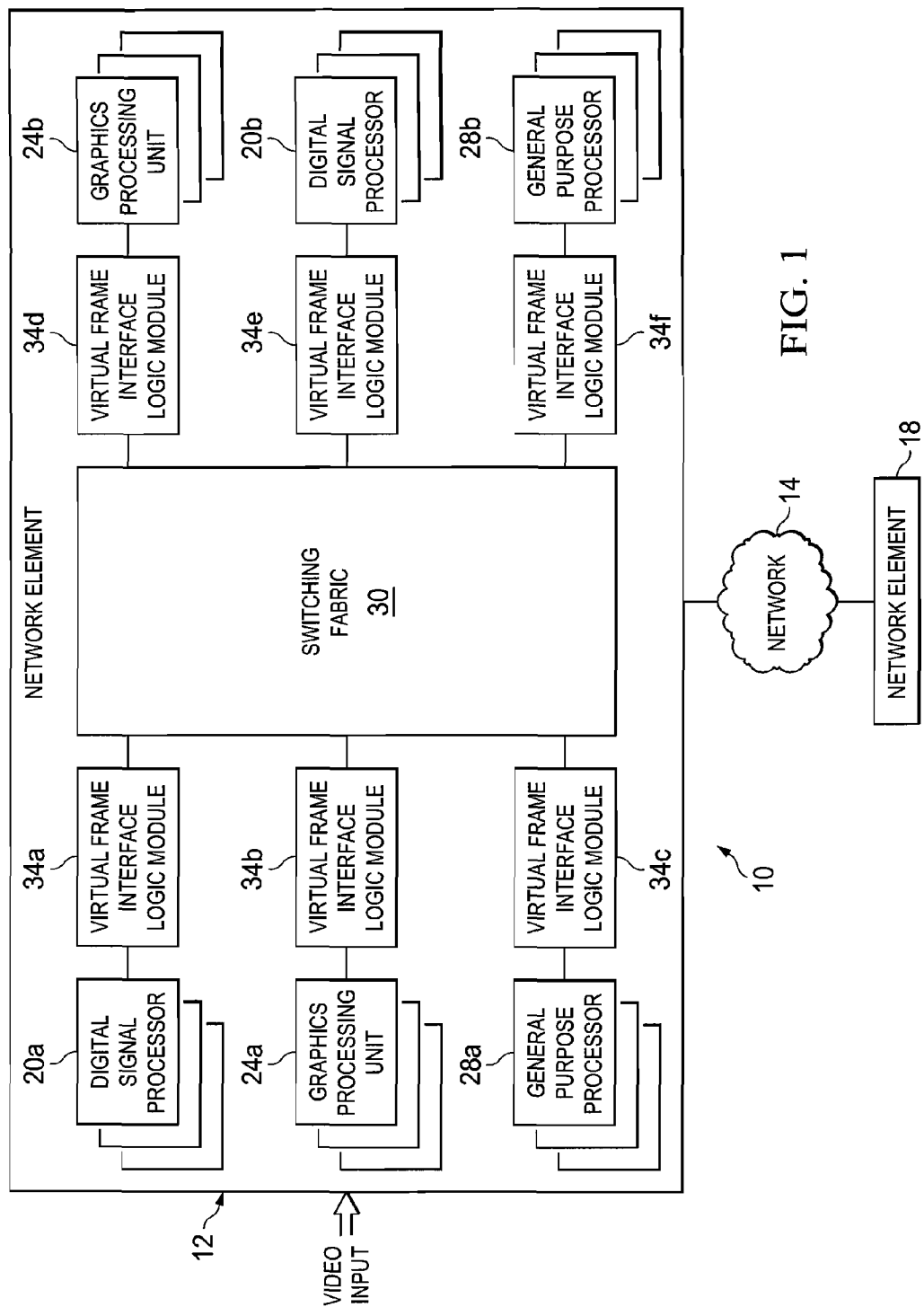
FIG. 1 is a simplified block diagram illustrating a data processing system having multiple, heterogeneous processors in accordance with one embodiment of the present disclosure.

Turning to FIG. 1, FIG. 1 is a simplified block diagram of an example embodiment of a data processing system 10 configured for data exchanges. In this particular implementation, data processing system 10 includes multiple, heterogeneous processors, which can provide real-time data exchanges. In one example embodiment, the architecture may include a network element 12, which further includes a set of digital signal processors 20a-b, a set of graphics processing units 24a-b, and a set of general purpose processors 28a-b. Each of digital signal processors 20a-b, graphics processing units 24a-b, and general purpose processors 28a-b may be connected to a switching fabric 30 through a respective virtual frame interface logic (VFIL) module 34a-f.

Network element 12 may be connected to another network element 18, where these elements can communicate through a network 14. Data processing system 10 may include a configuration capable of transmission control protocol/internet protocol (TCP/IP) communications for the transmission and/or reception of packets in a network. Data processing system 10 may also operate in conjunction with a user datagram protocol/IP (UDP/IP) or any other suitable protocol, where appropriate and based on particular needs. Unless otherwise indicated in context below, network elements 12, 18 use publicly available protocols or messaging services to communicate with each other through a network.

VFIL modules 34a-f may communicate with digital signal processors 20a-b, graphics processing units 24a-b, and general purpose processors 28a-b using a virtual frame mechanism, provided as a timing control. VFIL modules 34a-f can maintain synchronization logic and synchronize themselves with a global clock provisioned in any appropriate location.

In certain scenarios, the operations of data processing system 10 can be performed in conjunction with off-the-shelf processors from different vendors: having potentially different high-speed interfaces for real-time multiprocessing applications. Example embodiments described herein may use any suitable switching fabric, such as a layer 2 10G/20G switching fabric, to interconnect multiple processors with different types of interfaces for real time applications. For example, such processors may be used for certain types of video applications.

Operationally, the processor side interface of any given VFIL module depicted in FIG. 1 may be designed for a specific interface available to a particular processor, where the fabric side interface may be universal, or at least more consistent in its configuration. A single VFIL module can connect to many processors based on the size of a Printed Circuit Board (PCB), and based on the system architecture. A processor generally operates on a virtual frame at the frame rate of a received video sequence. The frame rate can be set to any appropriate number or level: up to the frame rate of the virtual frame. For example, a virtual frame rate can be 30 frames/second. For National Television System Committee (NTSC) video processing, a rate may be provided as 25 frames/second. In the latter case, the relevant processors are commonly configured to skip 5 frames/second of the virtual frame rate. Note that these frame rates are simply examples of the rates that can be provisioned, where other rates could readily be implemented in the embodiments outlined herein.

Semantically, a given VFIL module of FIG. 1 operates as a bridging tool to different types of interfaces for different types of processors. The bandwidth capacity of the architecture can adhere to a maximum capacity associated with the virtual frame. The VFIL module can maintain the virtual frame structure for both the transmit and the receive side of a given processor. A single VFIL module can be configured to connect multiple processors, as is being depicted in FIG. 1.

For purposes of illustrating certain example embodiments and operations of data processing system 10, it is important to understand the data and communications that may be traversing the network. The following foundational information may be viewed as a basis from which the present disclosure may be properly explained. As the demand for real-time video communications and processing continues to increase (particularly for high definition (HD) video), there is a challenge in scaling media processing platforms. This is particularly so for inter-connecting multiple processors to support real-time video processing requirements. A wide variety of video coder/decoders (codecs), resolutions, and frame rates are currently in use in many processing environments. Any number of video analysis operations and processing activities can be performed in the uncompressed video domain.

As a general proposition, processors are not designed with the inherent ability to interact with each other. Different processors are typically needed in order to offer specialized processing for given network communications, specific applications, certain video activities, etc. Video processing is typically subjected to such specialized operations. In a video processing environment, there are time constraints associated with processing. For example, the video frame rate imposes boundaries for processing intervals. Hence, any system that attempts to synchronize processing activities across different types of processors should respect the frame rate, along with latency parameters, packet loss issues, etc.

In accordance with one example embodiment, data processing system 10 can address the aforementioned issues associated with data processing in a heterogeneous multiprocessor environment. More specifically, data processing system 10 can provide a scalable system with clusters of processors, and suitably interconnect the processors for real-time video applications in a network environment. Data processing system 10 can intelligently provision transmitting processors that can be configured to synchronize themselves and, further, to communicate sub-frames without overlapping others. To synchronize the frames, the architecture can employ a virtual frame structure, which is understandable to each processor/hardware logic combination.

Certain logic can add this functionality such that any type of processor can operate effectively in an integrated circuit mesh. This can allow a given processor to time-division a frame at the scan line level such that no two (or more) processors would transmit a sub-frame at the same time to a single destination processor. Moreover, this would effectively create a viable, clean Time Division Multiplexing (TDM) structure. Furthermore, the frame header (as further discussed below) can define a multiplexed data stream occupied in a single virtual frame with a different destination addresses. This can allow a single processor to process multiple independent streams and, further, to communicate with other respective processors.

In addition to packet-dropping challenges, the mechanisms of data processing system 10 can also foster an effective pipeline of processing elements that are constructed from out of a loosely coupled processor arrangements. Each processor in the pipeline could operate synchronously based on the global virtual frame. After establishing the pipeline, frame flows would propagate from processor to processor without a delay (i.e., a holding time) at any stage. This would effectively reduce any type of end-to-end processing latency. Note that in certain implementations, there are no intermediate buffers required in the protocol such that the frame buffering delay can also be eliminated.

In one general sense, data processing system 10 is providing dedicated logic between processors, and potentially between any types of interface to the switch port. The hardware logic can maintain the virtual frame and the synchronization such that it converts the entire processing structure to a low-latency, zero-packet drop multiprocessor media processing platform (potentially employing standard processors and switches). In operational terms, different processors in the architecture can remain asynchronous, where a special circuit connected to each processor evaluates their associated TDM video busses in converting their timing to a synchronized domain. In this manner, the processors are being decoupled from the synchronization of the system, and their software can be simplified. The synchronization scheme can be distributed with no master node, which can also simplify the system implementation.

The associated interface circuits are indifferent to the type of processor in use on each processing node. Therefore, different types of processors in the architecture (potentially having different operating systems, different types of input/output (I/O) elements for data exchange) are seamlessly connected. This can allow for the construction of complex media processing pipelines, including DSPs, general purpose central processing units (GP CPUs), network processing units (NPUs), field programmable gate arrays (FPGAs), etc. Similarly, there are many options regarding the inter-processor communication links. For example, the communication links could be Ethernet-based (e.g., Ethernet dual stars), point-to-point links, various mesh topologies, etc.

It should be further noted that the architecture of data processing system 10 is flexible. For example, in the context of any video platform that attempts to dynamically allocate resources in meeting a wide range of video processing requests, data processing system 10 can offer a mechanism to efficiently pipeline (and suitably parallelize) the processing. This processing may be done across a large number of processing elements: some of which may be optimized to perform a subset of video processing functions. To help foster this objective, data processing system 10 can employ a high-speed, robust interconnection infrastructure (e.g., a 10 or 20 Gb/s Ethernet mechanism) in certain example implementations.

In common video environments, to maintain real-time processing data flows with minimal overhead for arbitration and, further, to avoid congestion in the switch fabric, participating processors may require certain events to synchronize themselves. The architecture of data processing system 10 is configured to synchronize processors based on a video frame: a unit that each processor can process to perform an identifiable function as part of the processing pipeline. Processors can process at least a single frame during a fixed frame time. A virtual frame may be defined to be similar to a real video frame. The virtual frame rate can define the processing and bandwidth for performing a unit task, and for communicating with a different processor. Logistically, each processor may be synchronized with a globally generated virtual frame synchronization clock. A multiplexing scheme may also be used to allow a single processor to communicate with more than one processor: within a single frame time. A scan line-based time division multiplexing (TDM) operation can be used to eliminate any intermediate storage requirement for video frame communications in a series of processors working in a pipeline. This can provide a common boundary, where processors can work independently on frames. The processors can also exchange data with each other in a parallel or pipeline mode in which frames are processed in stages (e.g., moving frame data at the defined frame boundary from processor to processor until the final stage of processing).

Details relating to the possible signaling and interactions between the components of data processing system 10 are provided below with reference to FIGS. 2-6. Before turning to some of the additional operations of this architecture, a brief discussion is provided about some of the infrastructure of the architecture.

Network elements 12 and 18 are devices that process, route, or switch (or that cooperate with each other in order to process, route, or switch) data and/or packets (potentially in a network environment). As used herein in this Specification, the term 'network element' is meant to encompass switches, routers, gateways, bridges, loadbalancers, firewalls, inline service nodes, proxies, servers, processors, modules, integrated circuits generally, or any other suitable device, component, element, or object operable to exchange data between processing elements. This network element may include any suitable hardware, software, components, modules, interfaces, or objects that facilitate the operations thereof. This may be inclusive of appropriate algorithms and communication protocols that allow for the effective exchange (reception and/or transmission) of data or information.

Note that the internal structure of network elements 12, 18 may share (or coordinate) certain processing operations. Using a similar rationale, their respective memory elements may store, maintain, and/or update data in any number of possible manners. In a general sense, the arrangement depicted in FIGS. 1-2 may be more logical in their representations, whereas a physical architecture may include various permutations/combinations/hybrids of these elements. In one example implementation, network elements 12, 18 include software (e.g., as part of VFIL modules 34a-f) to achieve the processing operations, as outlined herein in this document. In other embodiments, this feature may be provided externally to any of the aforementioned elements, or included in some other network element to achieve this intended functionality. Alternatively, several elements may include software (or reciprocating software) that can coordinate in order to achieve the operations, as outlined herein. In still other embodiments, any of the components of FIGS. 1-2 may include any suitable algorithms, hardware, software, components, modules, interfaces, or objects that facilitate these switching operations.

Digital signal processors 20a-b, graphics processing unit 24a-b, and general-purpose processors 28a-b are representative of processing tools that can be used in various types of applications. In certain instances, these applications may be associated with video, audio, voice, or any suitable combination of these. For this reason, the processors being depicted in FIG. 1 are not exhaustive, as any number of additional processors could be provisioned within network element 12. Any type of data processor, audio processor, and/or video processor could be deployed in network element 12 without departing from the broad teachings of the present disclosure. Using a similar rationale, switching fabric 30 is simply representative of one type of connection that could be made between processors and/or VFIL 34a-f. In other instances, switching fabric 30 may be replaced by any other suitable coupling mechanism such that packets can be exchanged between processors, network elements, etc.

Network 14 represents a series of points or nodes of interconnected communication paths for receiving and transmitting packets of information that propagate through data processing system 10. Network 14 can be any type of packet network (e.g., a switching network) in particular implementations of the present disclosure. The network offers a communicative interface between network elements (e.g., routers, switches, bridges, gateways, etc.) and may be any IP network, local area network (LAN), virtual LAN (VLAN), wireless LAN (WLAN), metropolitan area network (MAN), wide area network (WAN), extranet, Intranet, virtual private network (VPN), or any other appropriate architecture or system that facilitates communications in a network environment.

Figure 2:
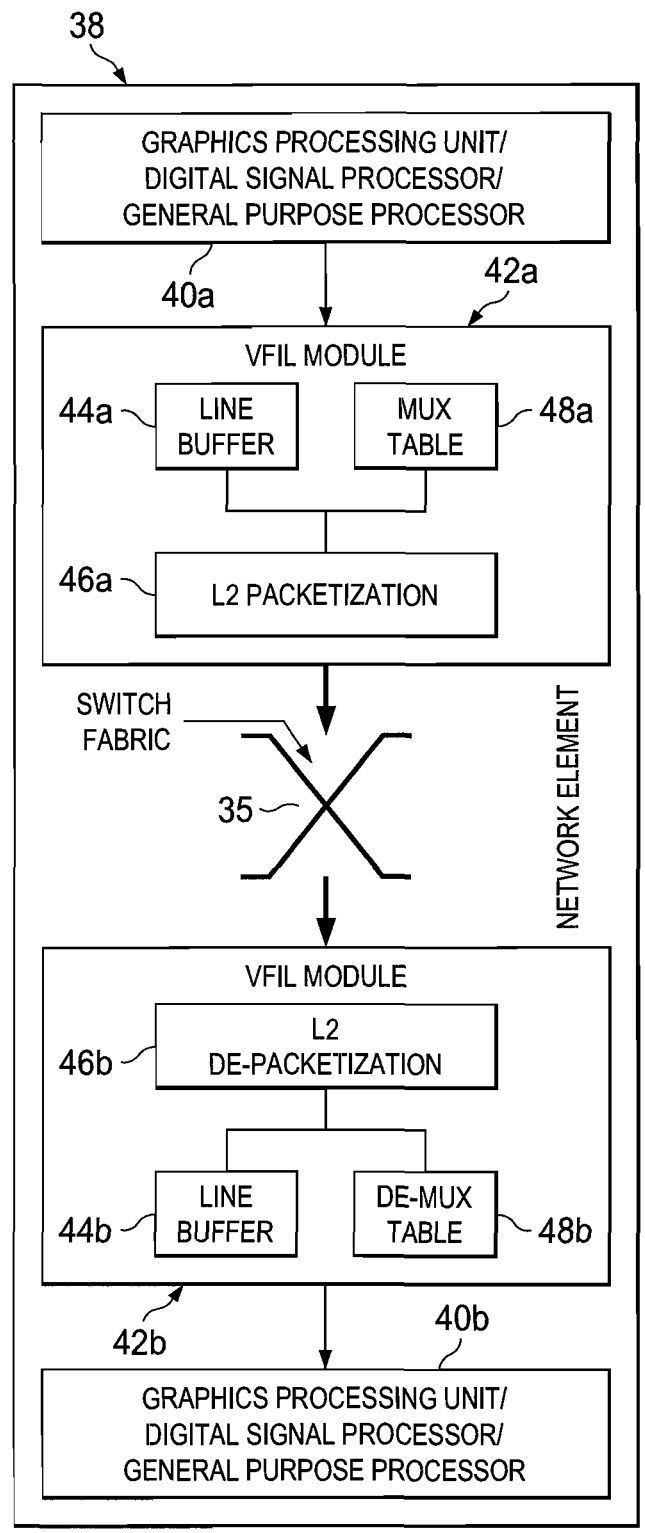
FIG. 2 is a simplified block diagram illustrating components that may be used in the data processing system in accordance with one example implementation.

FIG. 2 is a simplified block diagram illustrating an example of a network element 38 that may be used in conjunction with data processing system 10. As illustrated in FIG. 1, each processor may be connected to a respective VFIL module. The VFIL module can be an external, dedicated hardware assisted logic element, which can be provisioned in any suitable manner (e.g., implemented as an application specific integrated logic (ASIC), as a field programmable gate array (FPGA), etc.). To simplify the illustration, only two processors are shown in FIG. 2. In this instance, a graphics processing unit/digital signal processor/general-purpose processor 40a-b configuration is being depicted. VFIL module 42a may contain a line buffer 44a, a layer 2 (L2) packetization module 46a, and a multiplexing (MUX) table 48a, which includes any number of appropriate entries for particular data segments. Similarly, a VFIL module 42b may contain a relatively large line buffer 44b (based on maximum latency of a switch fabric 35), an L2 packetization module 46b, and a demultiplexing (DE-MUX) table 48b, which also includes a number of data entries for corresponding data segments. Packetization modules 46a-b may be used to either packetize or to de-packetize data: depending on the direction of data flow.

VFIL modules 42a-b may function as a bridge to different types of processor interfaces, with bandwidth capacity set to a maximum of the virtual frame. VFIL modules 42a-b may also maintain the virtual frame structure for both the transmit and receive side for a processor. The virtual frame at each VFIL module 42a-b can begin at the same time. The virtual frame contains a certain number of scan line buffers. The size of a virtual frame can be the same at each processor 40a-b. However, the granularity of a virtual frame can be the same as the scan line time.

Note that VFIL modules 34a-f could have their own separate processor for facilitating their operations. For purposes of illustration and clarity, these additional processors are not being depicted in FIG. 1 or 2. Additionally, VFIL modules 34a-f could access any type of memory element in order to carry out their activities. For example, each VFIL module can be provisioned with a memory element that stores electronic instructions and/or logic for executing the processing management activities discussed herein. Based on the bandwidth needed for a processor to process data, a central management processor may allocate a certain number of lines of the virtual frame both at a transmitter (e.g., processor 40a) and at receiver (e.g., processor 40b), during an entire session. During this time, a transmitting processor and a receiving processor can communicate through a virtual circuit. Because of the dedicated time allocation, congestion in switching fabric 35 may be minimized with low jitter on the data, and with minimal or no packet loss due to congestion. This is important for achieving viable video processing.

Figure 3A:
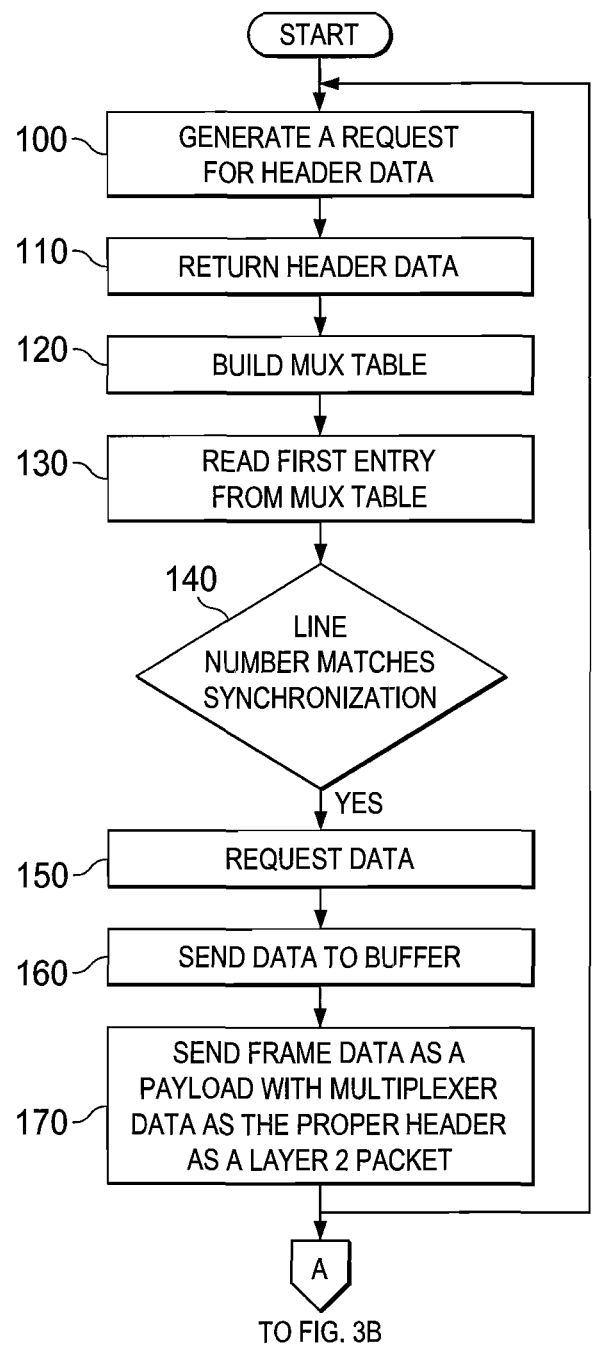
FIG. 3A-3B are simplified flowcharts illustrating potential operations of an example embodiment of the data processing system.
Figure 3B:
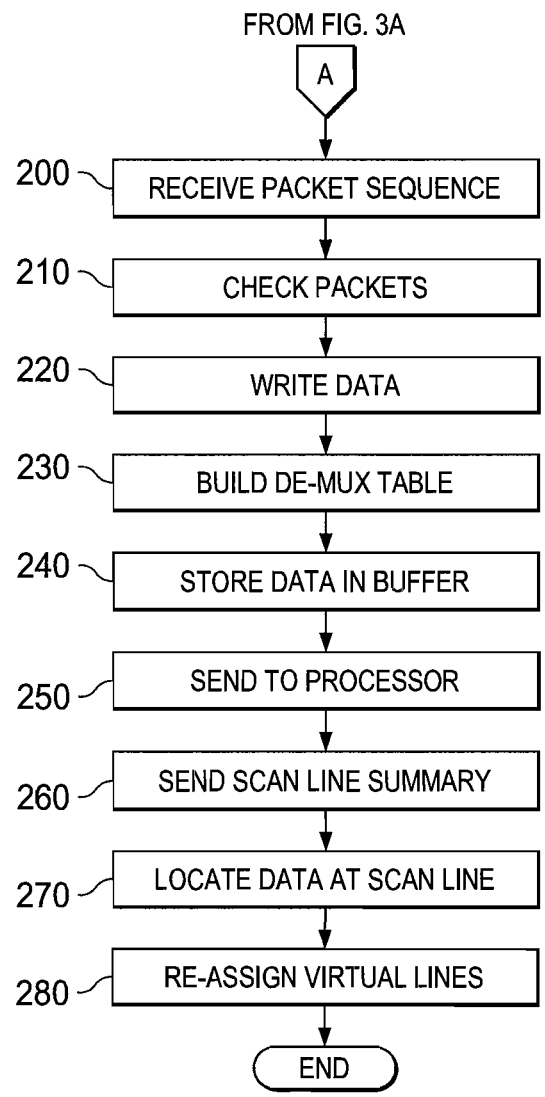

FIGS. 3A-B are simplified flowcharts that illustrate potential operations associated with data processing system 10. A VFIL module can be configured to isolate specific processor interfaces from the network and, further, can maintain the virtual frame timing. On the transmit side, the VFIL module can collect data from a processor at the proper time slot. More particularly, at step 100 a request for header information may be generated based on the type of communication that a processor currently has in its possession, such as RocketIO (RIO), PCI Express. Header data can be returned at step 110, which provides the video content of the frame ready to be sent. [Note that an example header format is illustrated in FIG. 4 and described in more detail below.] With the header data, a multiplexer table can be constructed at step 120. From the multiplexer table, the first entry is read at step 130.

Figure 5:
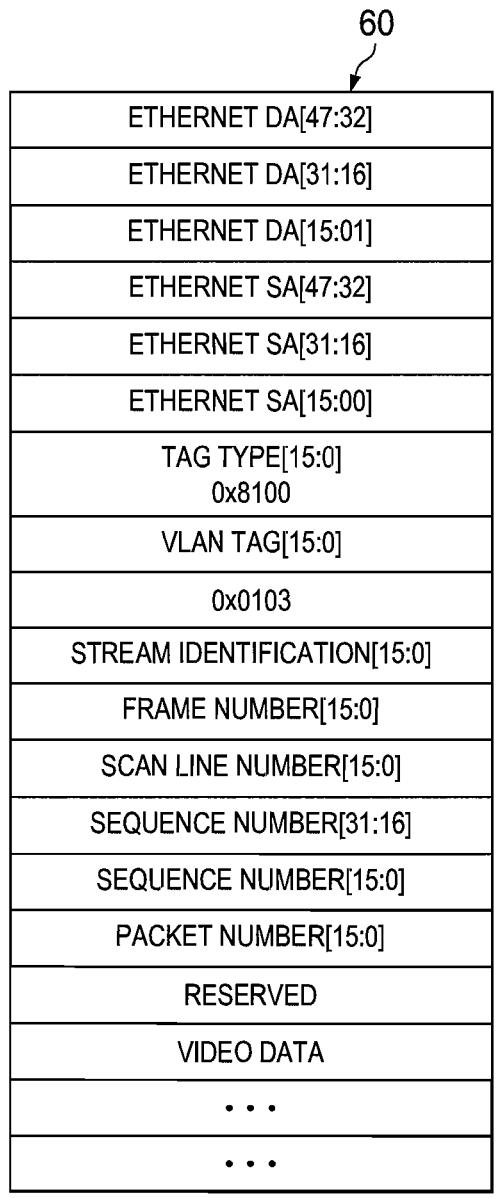
FIG. 5 is a simplified diagram illustrating an example embodiment of a packet format that may be used in the data processing system.

When the line number matches the synchronization logic at step 140, data is requested at step 150. A certain amount of data can be sent to a buffer at step 160 based on the request and the response time. At step 170, frame data can be sent as a payload, along with multiplexer data (as the proper header for a layer 2 packet), to the switching fabric. [Note that an example packet structure is illustrated in FIG. 5 and described in more detail below.] When the buffer is partially empty, another request can be sent to the processor at step 100. The process continues until the entire frame is completely transmitted. The end of active data is determined by the end line from the header.

For a synchronous interface, such as a BT1120 interface for example, a VFIL module can synchronize with the processor SYNC signal (e.g., VSYNC and HSYNC). On the transmit side, a header can be collected from the first line of a frame, where it then collects the scan line data from the processor. The header can describe the destination address, relevant scan lines, stream identification, frame identification, size, etc. Based on the header, the scan line data is collected from the processor. The header remains the same for any type of interface. For example, if the start line is one, then packets can be sent: starting with the 1st scan line. If the start line is 5, then the first 4 lines may be skipped, where packets are sent starting on the 5th scan line. Subsequent scan lines can be packetized and sent as packets until the last scan line is sent. If the frame contains more than one sub-frame, then the next entry is read from the MUX table, and the same process would repeat again.

For an asynchronous interface, such as PCI Express or Serial Rapid IO for example, a VFIL module can maintain a virtual frame (e.g., 2 VSYNC lines and 1122 pixel scan lines, total 1124 lines). During VSYNC lines, relevant MUX table data may be requested from a processor. The start scan line and the end scan line may be determined from the MUX table data. The start line number may be generated because the processor does not have a synchronized interface. Once the start line number from MUX table matches with the line number from the SYNC/frame generation logic, a request is sent to the processor to send scan line data. The process continues sub-frame by sub-frame until all the sub-frames are transmitted. Once the sub-frames have been transmitted, the VFIL module can wait for the next VSYNC, and then the process of sending the frame begins again.

The frame header can define a multiplexed data stream occupied in a single virtual frame with different destination addresses. This allows a single processor to process multiple independent streams, and to communicate with other respective processors. This can be applicable to cases where the processor needs to process low-resolution streams such as Common Intermediate Format (CIF) and Quarter CIF (QCIF) frame streams. Such an operation can save costs in terms of number of channels supported by the architecture because a single processor may be able to process multiple video streams.

Figure 6:
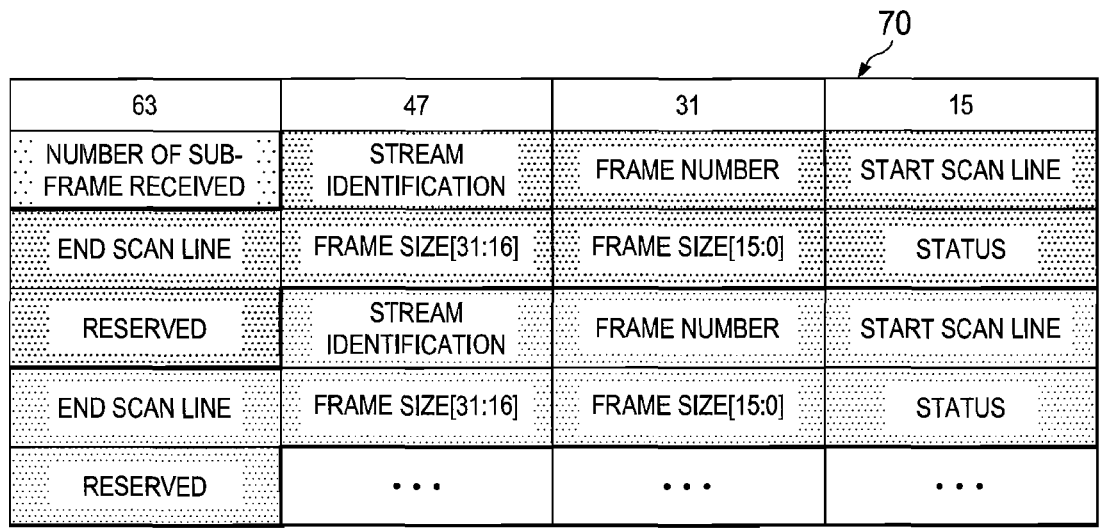
FIG. 6 is a simplified diagram illustrating an example embodiment of another header format that may be used in the data processing system.

Referring now to FIG. 3B, on the receiving side, a packet sequence can be received at step 200. Packets can be checked to verify they are within the virtual frame scan lines at step 210, where data can be written at step 220. Header information is subsequently collected from the packets and, further, the data can be written to the de-multiplexer table at step 230. At step 240, the data is placed in a frame buffer. Data is then sent to the processor at step 250 as soon as unit size data is available in the frame buffer. At the end of the frame time, a summary of a scan line, as collected from the header, may be passed on to the processor at step 260. The header is parsed, where the relevant data is located at the proper scan line of the deposited virtual frame, as reflected by step 270. [Note that an example of a header format is illustrated in FIG. 6 and described in more detail below.] Once the communication has been completed, the allocation of virtual lines may be re-assigned to a different set of processors at step 280.

After the video stream begins arriving at the first processor, the processor can complete processing of the frame. Based on further processing needs, the processor may forward the frame to a second processor over a virtual frame communication structure. The second processor may do the same and forward the frame to a third processor. After the requisite processing has been achieved, the video frame can leave the system. Note that in certain implementations, all the processors in the pipeline can complete their tasks in a frame time. Because of the virtual frame structure and the communication, there may not be a need for an intermediate storage of the frame data (other than with respect to the first processor). This can provide minimal latency of video data in and out of the system. On the transmit side, a VFIL module can collect and decode all the standard protocol timing codes. The VFIL module can also be configured to extract and encapsulate the active data from a given processor. If the active data is video data, certain types of intervals can be utilized to carry video data.

In a particular arrangement, two VSYNC lines can be used to start and to end an individual frame. The VSYNC line may be used to carry header information such that the interface does not need prior programming. The header can contain information such as destination address (e.g., unicast or multicast), VLAN tag information, stream identification number, frame size in terms of scan line, etc. Each frame can be preceded by a header and, further, contain the requisite information for routing the video data to one or to many destinations. The processor at the transmit side can modify its frame destination at the beginning of each frame, which makes channel switching from processor to processor uninterrupted.

In operation, as a VFIL module parses a frame from a processor, it may break the frame into packets. Each packet can contain sufficient information for routing the packet through the switch fabric to its intended destination (e.g., to another DSP). The packet may also contain the required identity information for a data stream such as source, stream identification, frame number, scan lines, and sequence numbers, etc., which would allow the receiving side to reconstruct frames for a certain stream.

A receiving VFIL module within network elements 12, 38 may extract header information from the incoming packets (received from the switch fabric), strip off the header, insert timing codes, and forward the frame to the receiving processor's interface, such as a BT.1120 type video port interface (VPIF). At the end of a frame, the header information can be forwarded to the processor during the VSYNC line such that the receiving processor can identify the location, size, and channel identification of the received frame/sub-frames. In one general sense, this would enable the receiving processor to operate on the received frame.

An example format of a header 50 (e.g., as may be used at step 110 FIG. 3A) is illustrated in FIG. 4. In this example, a 64-bit memory is employed for purposes of discussion. The transmission order in this particular example is from most significant bit (MSB) to least significant bit (LSB), where each header is 32 bytes long. Thus, for a video port interface width of 16 bits, the order of transmission would be bits 63-48, 47-32, 31-16, and finally 15-0. A VSYNC line can define as many as 128 distinct sub-frames for a complete video port frame. If a processor is idle with no data to transmit, the '# Of Sub-frame' field may be set to 0, which may be used as a signal to a VFIL module not to send any packets to the switch fabric. In FIG. 4, header information for two sub-frames is depicted (indicated by the fields between the bold lines). The particular fields in the example header 50 of FIG. 4 are described in more detail below. Before turning to those descriptions, it is imperative to note that these fields could be changed, replaced, altered, removed, or new fields could be used in the header, where these changes may be based on particular configuration needs.

The # Of Sub-frame field can be used to define how many distinct streams are being sent to other processors in the data part of the frame. This allows for multiplexed processing of many channels for low bandwidth applications. In practical terms, the largest frame may be 1122 lines with 2176 pixels, and the smallest frame can consist of a single scan line of 2176 pixels in this particular embodiment.

The Ethernet Destination Address field may contain the media access control (MAC) address of the recipient processor. The Ethernet Source Address field may contain the MAC address of the transmitting processor. The VLAN TAG field may be a virtual local area network tag value. The Ether Type field may contain Hex 0103 to indicate uncompressed video data. The Stream ID field may include a 16-bit number to identify a video stream in the system (a processor may assign this field). The Frame# field may include a 16-bit number starting with 1 and wrapping after 64 k frames. The Start Scan Line field may include the sub-frame start location in the frame. The End Scan Line field may contain the sub-frame end location in the frame. The Length in bytes field may contain the sub-frame length in bytes. This value can simplify locating lost data in a stream. The foregoing header fields are repeated based on the number of sub-frames, i.e., the value of "# Of Sub-frame." The example of FIG. 4 illustrates header fields for two sub-frames.

An example embodiment of a packet 60 (e.g., as may be used in step 170, as depicted in FIG. 3A) is illustrated in FIG. 5. The fields in the this example packet 60 are generally the same as those in header 50 (illustrated in FIG. 4), except that the Sequence # field may define the remaining bytes to be sent for a sub-frame including the packet. The Packet # field is a counter that may be initially set to 0 and incremented sequentially, as the processing occurs.

An example embodiment of a header 70 (e.g., as may be used at step 270 of FIG. 3B) is illustrated in FIG. 6. Note that header 70 is properly segmented based on bit allocations. In this particular example, a number of fields are used to assist in the processing. For example, the scan line delineations are identified (e.g., and scan line, start scan line). Additionally, header 70 includes an identification for the frame size, the frame number, and the end stream identification in this example implementation. Additionally, header 70 includes a status field that may reflect the consistency of the frame, the reporting delayed packets, and the identification of missing packets. The status field may also help guide the receiving processor to take special actions, as needed. The status information with respect to two sub-frames (indicated by the fields between the bolded lines) is shown in FIG. 6. Also provided in header 70 is a reserved segment, which can be leveraged for particular video application needs, or specific video transmission scenarios.

Note that in certain example implementations, the processing functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element can store data used for the operations described herein. This includes the memory element being able to store software, logic, code, or processor instructions that can be executed to carry out the activities described in this Specification. A processor can execute any type of instructions associated with the data to achieve the operations detailed herein in this Specification. In one example, a processor could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., FPGA, an erasable programmable read only memory (EPROM), an electrically erasable programmable ROM (EEPROM)) or an ASIC that includes digital logic, software, code, electronic instructions, or any suitable combination thereof.

In one example implementation, VFIL modules 34*a-f* include software in order to achieve the processing functions outlined herein. These activities can be facilitated by network element 12 and/or any of the internal elements of FIGS. 1-2. Network elements 12 and 18 can include memory elements for storing information to be used in achieving the intelligent processing control, as outlined herein. Additionally, network elements 12 and 18 may include a processor that can execute software or an algorithm to perform the processing activities, as discussed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any possible memory items (e.g., database, table, cache, buffer, etc.) should be construed as being encompassed within the broad term 'memory element.' Similarly, any of the potential processing elements, modules, and machines described in this Specification should be construed as being encompassed within the broad term 'processor.'

Note that with the examples provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that data processing system 10 (and its teachings) are readily scalable and can accommodate a large number of components, as well as more complicated/sophisticated arrangements and configurations. Accordingly, the examples provided should not limit the scope or inhibit the broad teachings of data processing system 10 as potentially applied to a myriad of other architectures. Additionally, although described with reference to particular scenarios, where VFIL modules 34a-f are provided within the network elements, these modules can be provided externally, or consolidated and/or combined in any suitable fashion. In certain instances, VFIL modules 34a-f are provided in a single proprietary unit.

It is also important to note that the steps in the appended diagrams illustrate only some of the possible signaling scenarios and patterns that may be executed by, or within, data processing system 10. Some of these steps may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by data processing system 10 in that any suitable arrangements, chronologies, configurations, and timing mechanisms may be provided without departing from the teachings provided herein.

Additionally, although discussed herein with reference to video applications generally, it should be noted that the teachings of the present disclosure are applicable to a wide range of scenarios. For example, data processing system 10 can readily be used in any type of video conferencing, Telepresence scenarios, mobile phone applications, personal computing instances, etc. Virtually any configuration that seeks to intelligently exchange video data (wired or wireless) involving a network data exchange, or involving non-network-based applications, can benefit from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
generating a request for header data, wherein the request is sent to a first processor;
receiving a response from the first processor that is indicative of video data for a virtual frame to be communicated;
generating a multiplex table based on the response;
evaluating a multiplex entry in the multiplex table for synchronization with a line number;
requesting the first processor to send at least a portion of the virtual frame after the synchronization; and
communicating a packet, which includes a payload associated with the virtual frame and a packet header that includes multiplex data associated with the multiplex entry.

2. The method of claim 1, further comprising:
receiving the packet through a switch fabric;
extracting scan line data from the packet;
assembling the scan line data into an additional frame; and
sending the additional frame to a second processor.

3. The method of claim 1, further comprising:
evaluating a buffer level in order to determine whether to send an additional request to the first processor in order to communicate remaining portions of the virtual frame.

4. The method of claim 1, wherein information within the packet header is evaluated for positioning into a de-multiplex table, and wherein the video content that is received is positioned in a line buffer.

5. The method of claim 1, wherein at least a portion of the virtual frame is forwarded to a second processor for additional processing, and wherein each processing task performed by the first and second processors is completed during a video frame rate set by a global clock coupled to the first processor and the second processor.

6. The method of claim 1, wherein the packet is a layer 2 (L2) packet that includes a destination address, the packet being communicated to a switch fabric of a network element.

7. The method of claim 1, wherein the packet header includes a selected one of a group of fields, the group consisting of:
a field indicative of a number of sub-frames associated with scan line data;
a source address field;
a virtual local area network (VLAN) tag field;
a stream identification field;
a frame number field; and
a length field.

8. Logic encoded in one or more tangible media that includes code for execution and when executed by a processor operable to perform operations comprising:
generating a request for header data, wherein the request is sent to a first processor;
receiving a response from the first processor that is indicative of video data for a virtual frame to be communicated;
generating a multiplex table based on the response;
evaluating a multiplex entry in the multiplex table for synchronization with a line number;
requesting the first processor to send at least a portion of the virtual frame after the synchronization; and communicating a packet, which includes a payload associated with the virtual frame and a packet header that includes multiplex data associated with the multiplex entry.

9. The logic of claim 8, the operations further comprising:
receiving the packet through a switch fabric;
extracting scan line data from the packet;
assembling the scan line data into an additional frame; and
sending the additional frame to a second processor.

10. The logic of claim 8, the operations further comprising:
evaluating a buffer level in order to determine whether to send an additional request to the first processor in order to communicate remaining portions of the virtual frame.

11. The logic of claim 8, wherein information within the packet header is evaluated for positioning into a de-multiplex table, and wherein the video content that is received is positioned in a line buffer.

12. The logic of claim 8, wherein at least a portion of the virtual frame is forwarded to a second processor for additional processing, and wherein each processing task performed by the first and second processors is completed during a video frame rate set by a global clock coupled to the first processor and the second processor.

13. The logic of claim 8, wherein the packet is a layer 2 (L2) packet that includes a destination address, the packet being communicated to a switch fabric of a network element.

14. The logic of claim 8, wherein the packet header includes a source address field, a stream identification field, and a frame number field.

15. An apparatus, comprising:
a plurality of processors operable to execute instructions associated with electronic code; and
a virtual frame module configured to interface with the processors to cause the apparatus to:
generate a request for header data, wherein the request is sent to a first processor;
receive a response from the first processor that is indicative of video data for a virtual frame to be communicated;
generate a multiplex table based on the response;
evaluate a multiplex entry in the multiplex table for synchronization with a line number;
request the first processor to send at least a portion of the virtual frame after the synchronization; and
communicate a packet, which includes a payload associated with the virtual frame and a packet header that includes multiplex data associated with the multiplex entry.

16. The apparatus of claim 15, wherein the apparatus is configured to:
evaluate a buffer level in order to determine whether to send an additional request to the first processor in order to communicate remaining portions of the virtual frame.

17. The apparatus of claim 15, wherein information within the packet header is evaluated for positioning into a de-multiplex table, and wherein the video content that is received is positioned in a line buffer.

18. The apparatus of claim 15, wherein at least a portion of the virtual frame is forwarded to a second processor for additional processing, and wherein each processing task performed by the first and second processors is completed during a video frame rate set by a global clock coupled to the first processor and the second processor.

19. The apparatus of claim 15, wherein the packet is a layer 2 (L2) packet that includes a destination address, the packet being communicated to a switch fabric of a network element.

20. The apparatus of claim 15, wherein the packet header includes a source address field, a stream identification field, and a frame number field.

* * * * *